US012296438B2

(12) United States Patent
Hsieh

(10) Patent No.: US 12,296,438 B2
(45) Date of Patent: May 13, 2025

(54) WRENCH WITH MOVABLE MALLET PLATFORM

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 378 days.

(21) Appl. No.: 18/060,767

(22) Filed: Dec. 1, 2022

(65) Prior Publication Data

US 2023/0173647 A1 Jun. 8, 2023

(30) Foreign Application Priority Data

Dec. 7, 2021 (TW) ................................ 110145721

(51) Int. Cl.
*B25B 13/06* (2006.01)
*B25B 13/08* (2006.01)
*B25G 1/10* (2006.01)

(52) U.S. Cl.
CPC .............. *B25B 13/06* (2013.01); *B25B 13/08* (2013.01); *B25G 1/10* (2013.01)

(58) Field of Classification Search
CPC ......... B25B 13/02; B25B 13/06; B25B 13/08; B25B 19/00; B25B 23/16; B25F 1/00; B25G 1/10
See application file for complete search history.

(56) References Cited

U.S. PATENT DOCUMENTS 317,738 A * 5/1885 Crosby ..................... B25B 7/22 81/131
1,850,239 A * 3/1932 McCarthy ............... B25B 19/00 81/463
2,466,884 A * 4/1949 English ................... B25B 13/08 81/177.6
4,864,902 A * 9/1989 Doorley .................. B25B 19/00 81/466
6,085,621 A * 7/2000 Nezigane .............. B25B 13/467 81/465
6,092,442 A * 7/2000 Macor .................... B25G 1/063 81/177.1
6,961,973 B1 * 11/2005 Smith ..................... B25F 1/006 7/143

(Continued)

FOREIGN PATENT DOCUMENTS

CN 104029155 A * 9/2014 ............. B25B 13/08
DE 29918330 U1 * 10/2000 ............. B25B 13/08

*Primary Examiner* — David B. Thomas
(74) *Attorney, Agent, or Firm* — Wang Law Firm, Inc.

(57) ABSTRACT

A wrench with a movable mallet platform is proposed. The wrench with a movable mallet platform includes a wrench main body and a mallet platform. The wrench main body includes a shaft. The shaft includes at least one abutment surface. The mallet platform is slidably sleeved on the wrench main body, and includes at least one striking portion and two holding portions. An engagement surface extends toward the shaft from at least one striking portion, and the engagement surface abuts against the at least one abutment surface. The two holding portions are disposed opposite to each other, and each of the two holding portions is connected to the at least one striking portion. Thus, the wrench with a movable mallet platform of the present disclosure can be struck by a striking tool, thereby fastening or releasing a fastening member.

10 Claims, 6 Drawing Sheets

(56) References Cited

U.S. PATENT DOCUMENTS

| | | | | |
|---|---|---|---|---|
| 7,069,822 | B1 * | 7/2006 | Mathis | B25G 1/063 81/177.1 |
| 9,079,300 | B2 * | 7/2015 | Poindexter | B25B 23/00 |
| 9,682,462 | B2 * | 6/2017 | Wong | B25B 7/12 |
| 10,065,454 | B2 * | 9/2018 | Coetzee | B25D 1/16 |
| 11,247,315 | B2 * | 2/2022 | MacDonald | B25B 23/0035 |
| 2020/0406432 | A1 * | 12/2020 | Ardente | B25B 13/08 |
| 2022/0024002 | A1 * | 1/2022 | Monson | B25B 13/06 |

* cited by examiner

WRENCH WITH MOVABLE MALLET PLATFORM

BACKGROUND OF THE INVENTION

1. Technical Field

The present invention is related to a wrench, and in particular, to wrench with a movable mallet platform and a mallet platform.

2. Description of Related Art

When a hand tool is used to fasten or release a fastening member, it often requires to exert a greater force on the fastening member instantly. Except for the use of electric impacting tools to exert high impact force on the fastening member instantly, for a working environment where electric impacting tool is not available, a hammer tool can also be used to hammer the driving direction of the hand tool, in order to allow the hand tool to be exerted with a high impact force on the fastening member instantly. However, when a user uses a hammer tool to perform hammering on the handle of a conventional hand tool, accidental hand injury often occurs. A striking wrench equipped with a striking platform formed at the rear end of its handle and provided for a striking tool to impact thereon is known to be available in the market. However, for such known striking wrench, since the striking platform provided for the striking tool is integrally formed at the rear end of the handle, such striking wretch is typically a single-head hand tool.

In view of the above, there is a need to develop a wrench with a movable mallet platform and a mallet platform suitable for a double-head hand tool to satisfy the industrial needs and to overcome drawbacks of known devices.

BRIEF SUMMARY OF THE INVENTION

Accordingly, an objective of the present invention is to provide a wrench with a movable mallet platform and a mallet platform, such that by using an engagement surface to abut against at least one abutment surface of a shaft, the mallet form can be slidably sleeved on the wrench main body.

According to an embodiment of a structure of the present invention, a wrench with a movable mallet platform is provided, and the wrench comprises a wrench main body and a mallet platform. The wrench main body comprises a shaft. The shaft comprises at least one abutment surface. The mallet platform is slidably sleeved on the wrench main body and comprises at least one striking portion and two holding portions. The at least one striking portion includes an engagement surface extending toward the shaft. The engagement surface abuts against the at least one abutment surface. The two holding portions are disposed opposite to each other and each one of the holding portions is connected to the at least one striking portion.

Accordingly, the wrench with a movable mallet platform of the present invention can be provided for the striking by a striking tool in order to fasten or release a fastening member.

According to another embodiment of the present invention: the aforementioned mallet platform further comprises an anti-skid layer. The anti-skid layer covers the holding portions and the anti-skid layer is made of a rubber material.

According to another embodiment of the present invention: the aforementioned mallet platform further comprises a holding structure. The holding structure is arranged at each one of the holding portions, the holding structure is configured to match a finger portion of a user and is provided for the finger portion of the user to hold thereon.

According to another embodiment of the present invention: the aforementioned mallet platform further comprises a through hole, an elastic member, a roller and a cover. The elastic member is arranged at the through hole and is perpendicular to the shaft. The roller is connected to the elastic member and is provided to abut against the at least one abutment surface. The cover is arranged at the at least one striking portion and is provided to retain the elastic member at the through hole.

According to another embodiment of the present invention: the aforementioned wrench main body further comprises at least one driving end. The at least one driving end is connected to the shaft and drives a hand tool along a driving direction of the wrench main body. In addition, the two holding portions are arranged parallel with the driving direction, and the at least one striking portion is perpendicular to the driving direction.

According to another embodiment of the present invention: A quantity of the at least one driving end is two, and the mallet platform is retained between the two driving ends.

According to another embodiment of a structure of the present invention, a mallet platform is provided, and the mallet platform is arranged on a wrench main body. The wrench main body comprises a shaft, and the shaft comprises at least one abutment surface. The mallet platform comprises at least one striking portion and two holding portions. The at least one striking portion includes an engagement surface extending toward the shaft. The engagement surface abuts against the at least one abutment surface. The two holding portions are disposed opposite to each other and each one of the holding portions is connected to the at least one striking portion. In addition, the mallet platform is slidably sleeved on the wrench main body.

Accordingly, the wrench with a movable mallet platform of the present invention can be provided for the striking by a striking tool in order to fasten or release a fastening member.

According to another embodiment of the present invention: the aforementioned mallet platform further comprises an anti-skid layer. The anti-skid layer covers the holding portions and the anti-skid layer is made of a rubber material.

According to another embodiment of the present invention: the aforementioned mallet platform further comprises a holding structure. The holding structure is arranged at each one of the holding portions, the holding structure is configured to match a finger portion of a user and is provided for the finger portion of the user to hold thereon.

According to another embodiment of the present invention: the two holding portions are arranged parallel with a driving direction of the wrench main body, and the at least one striking portion is perpendicular to the driving direction.

DETAILED DESCRIPTION OF THE INVENTION

The following describes a plurality of embodiments of the present invention along with the accompanied drawings. For the purpose of providing a clear and definite description, a lot of details in practice will be explained one by one in the following. However, it shall be understood that these details in practice shall not be used to limit the scope of the present invention. In other words, in some of the embodiments of the present invention, such details in practice are not necessary elements or components. In addition, to simplify the drawings, some of the commonly known structures and elements are presented in simple schematic views only. Moreover, repetitive elements may be labeled in the same number.

Furthermore, when a certain element (or unit or module, etc.) is described to be "connected" to another element in this content, it means that the element is directly connected to the other element, or it may also mean that the certain element is indirectly connected to another element, i.e., there is other element arranged between the certain element and the another element. In addition, when a certain element is explicitly described to be "directly connected" to another element, it means that there is no other element arranged between the certain element and the another element. The terms of "first", "second" and 'third" are used to describe different elements only, such that they impose no restriction to the elements. Accordingly, the first element may also be changed to be called as the second element. Furthermore, a combination of elements/units/circuits described in this content does not refer to a combination that is generally known in this field or a combination of common practice or known combination. Accordingly, the mere determination on whether individual element/unit/circuit is known shall not be used to determine whether the combination can be easily achieved by a person with ordinary skill in the art of the technical field.

Figure 1:
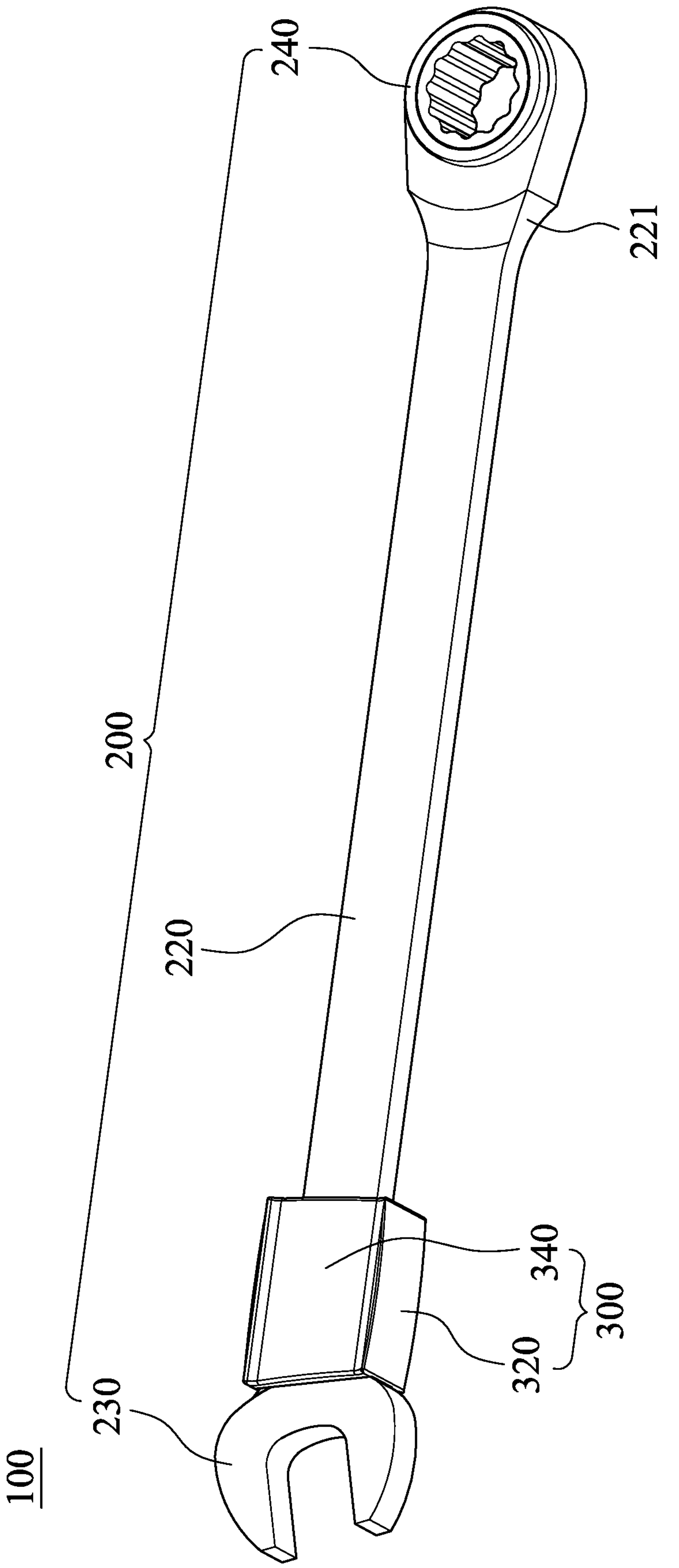
FIG. 1 is a perspective view of the wrench with a movable mallet platform according to the first embodiment of the present invention.
Figure 2:
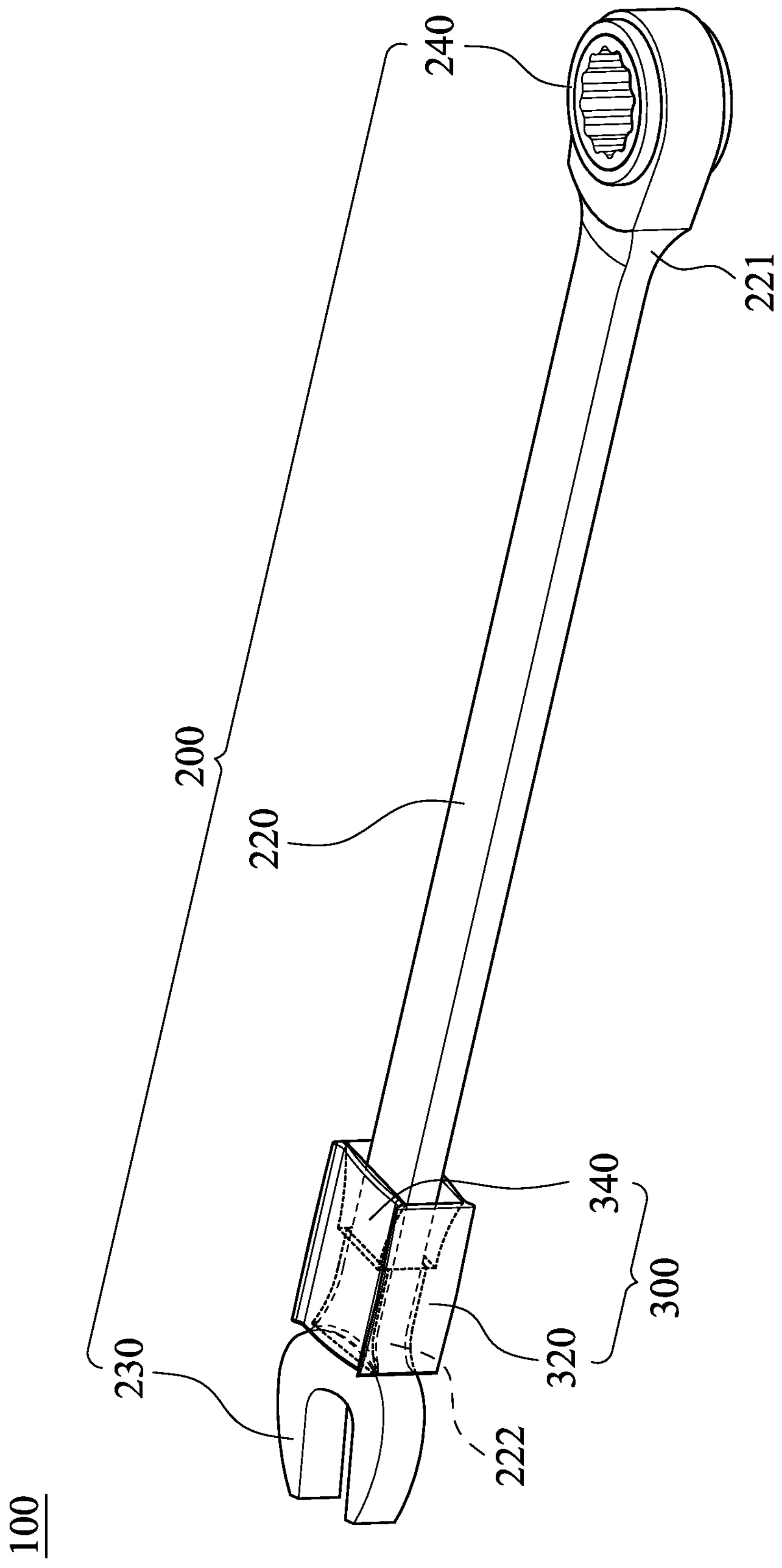
FIG. 2 is a see-through view of the mallet platform of the wrench with a movable mallet platform according to the embodiment shown in FIG. 1.
Figure 3:
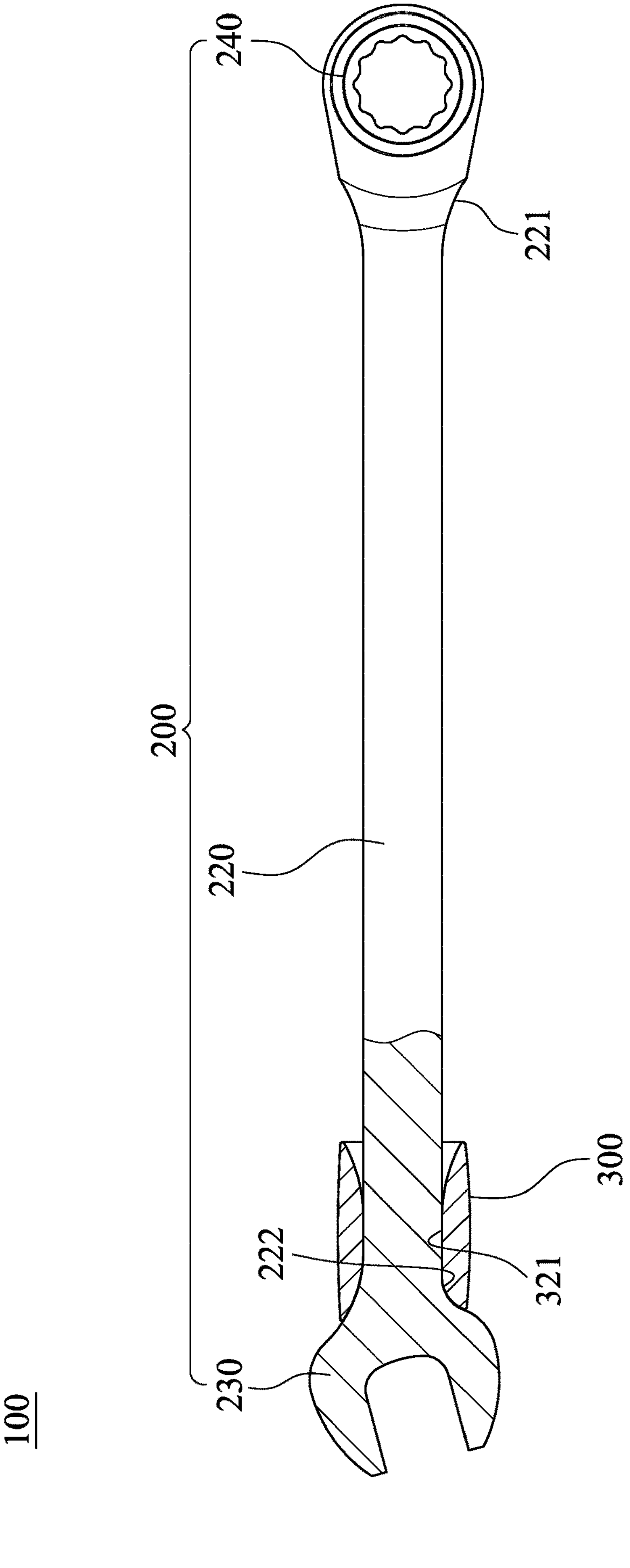
FIG. 3 is a cross sectional view of the embodiment shown in FIG. 1.

Please refer to FIG. 1 to FIG. 3. FIG. 1 shows a perspective view of the wrench 100 with a movable mallet platform according to the first embodiment of the present invention. FIG. 2 is a see-through view of the mallet platform of the wrench 100 with a movable mallet platform 300 according to the embodiment shown in FIG. 1; FIG. 3 is a cross sectional view of the embodiment shown in FIG. 1. The wrench 100 with a movable mallet platform, comprises a wrench main body 200 and a mallet platform 300. The wrench main body 200 comprises a shaft 220. The shaft 220 comprises at least one abutment surface 221, 222. The mallet platform 300 is slidably sleeved on the wrench main body 200 and comprises at least one striking portion 320 and two holding portions 340. The at least one striking portion 320 includes an engagement surface 321 extending toward the shaft 220. The engagement surface 321 abuts against the at least one abutment surface 221. The two holding portions 340 are disposed opposite to each other and each one of the holding portions 340 is connected to the at least one striking portion 320.

The wrench main body 200 further comprises driving ends 230, 240. The driving end 240 is connected to the shaft 220, and the driving end 230 is connected to the at least one abutment surface 222. The driving ends 230, 240 drive a hand tool (not shown in the drawings) along a driving direction of the wrench main body 200. In addition, the two holding portions 340 are arranged parallel with the driving direction, and the at least one striking portion 320 is perpendicular to the driving direction. In this embodiment, the quantity of the at least one striking portion 320 is two, and the quantity of the at least one driving end 230, 240 is two. The mallet platform 300 is retained between the driving ends 230, 240. The driving end 230 is an open-end wrench, and the driving end 240 is a ratchet wrench; however, the present invention is not limited to such type of configuration only.

To be more specific, the two ends of the abutment surface 221 are attached to the shaft 220 and the driving end 240 respectively. Since the sizes of the shaft 220 and driving end 240 are different, the abutment surface 221 connected between the shaft 220 and the driving end 240 has a curved shape. The two ends of the abutment surface 222 are attached to the shaft 220 and the driving end 230 respectively. Since the sizes of the shaft 220 and the driving end 230 are different, the abutment surface 222 connected between the shaft 220 and the driving end 230 has a curved shape. The mallet platform 300 is a hollow structure of a column shape. The mallet platform 300 can be made of a rigid material different from the material of the wrench main body 200. The shape of the engagement surface 321 matches with the shape of the abutment surface 221, 222, and the shape of the abutment surface 321 corresponds to the curved shape of the abutment surface 221, 222. When the driving end 240 exerts a force on a fastening member, the mallet platform 300 is able to move toward the driving end 230 and abuts against the abutment surface 222, in order to provide a striking plane, allowing the user to perform striking on the striking portion 320, such that the driving 240 exerts an extremely large force on the fastening member instantly, thereby releasing the fastening member from its locked state, or fastening the unfastened fastening member to the fastened state.

Accordingly, the wrench 100 with a movable mallet platform of the present invention is able to provide striking plane in order to increase the striking surface area during the use of a striking tool of the user, and it is also able to reduce the probably of accidental hand injury of the user due to impact of the striking tool on the shaft 220.

Figure 4:
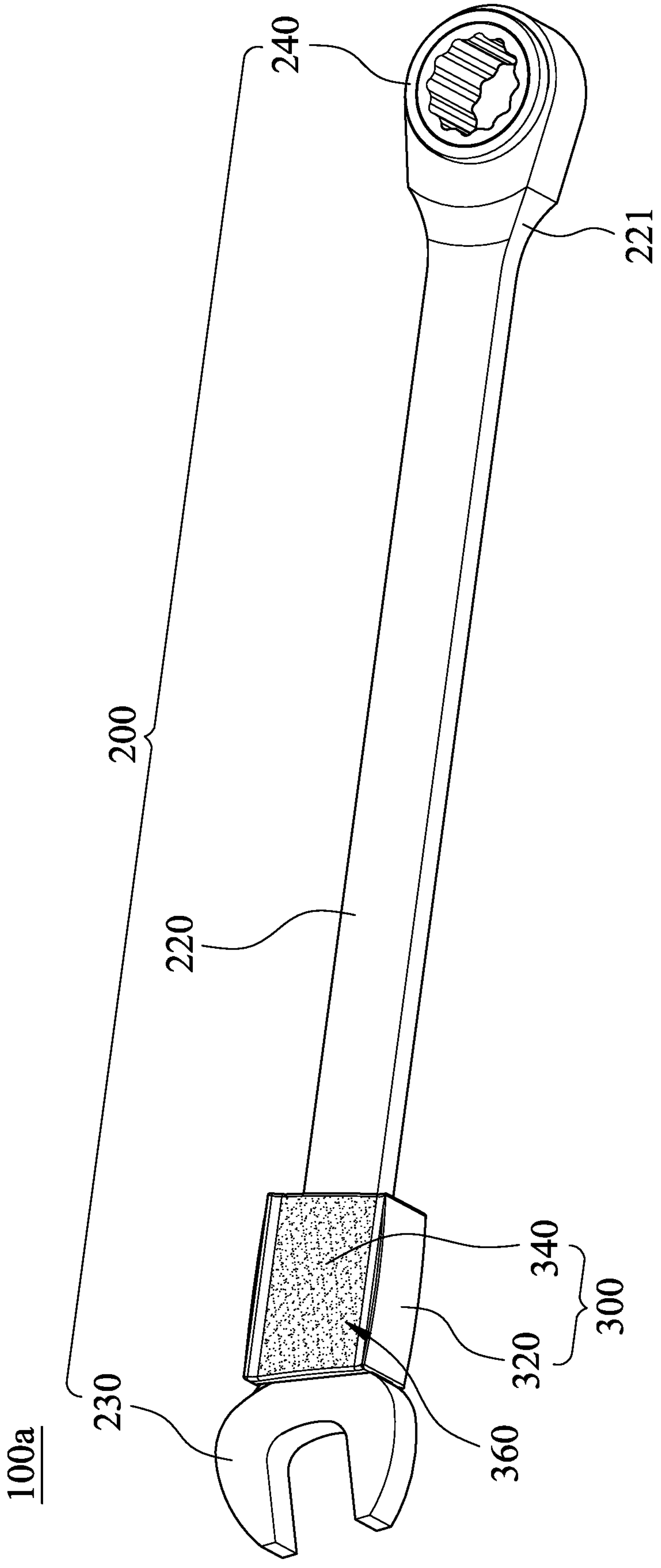
FIG. 4 is a perspective view of the wrench with a movable mallet platform according to the second embodiment of the present invention.

Please refer to FIG. 2 and FIG. 4. FIG. 4 shows a perspective view of the wrench 100*a* with a movable mallet platform according to the second embodiment of the present invention. The wrench 100*a* with a movable mallet platform, comprises a wrench main body 200 and a mallet platform 300. The wrench main body 200 comprises a shaft 220. The shaft 220 comprises at least one abutment surface 221, 222. The mallet platform 300 comprises two striking portions 320 and two holding portions 340. In this embodiment, the wrench main body 200, the shaft 220, the abutment surface 221, 222, the two striking portions 320 and the two holding portions 340 have the same structure as that of the wrench main body 200, the shaft 220, the abutment surface 221, 222, the two striking portions 320 and the two holding portions 340 of the embodiment shown in FIG. 2 respectively; therefore, details thereof are omitted hereafter. It shall be noted that the mallet platform 300 further comprises an anti-skid layer 360. The anti-skid layer 360 covers the holding portions 340, and the anti-skid layer 360 is made of a rubber material. To be more specific, when the wrench

100*a* with a movable mallet is used to perform fastening action without the use of a striking tool for striking, the mallet platform 300 can still be provided for holding by the user. Accordingly, the wrench 100*a* with a movable mallet platform of the present invention having the surfaces of the two holding portions 340 being coated with the anti-skid layer 360 is able to increase the gripping force of the user, such that it is able to perform fastening or releasing action on the fastening member stably.

In another embodiment of the present invention, the mallet platform may further include a holding structure (not shown in the drawings). The holding structure is arranged at each one of the holding portions, the holding structure is configured to match a finger portion of a user and is provided for the finger portion of the user to hold thereon. In other words, the surface of the holding portion includes a concave-convex structure matching with a finger portion of human body. Accordingly, for the wrench with a movable mallet platform of the present invention, the shaft can be held firmly via the holding structure.

Figure 5:
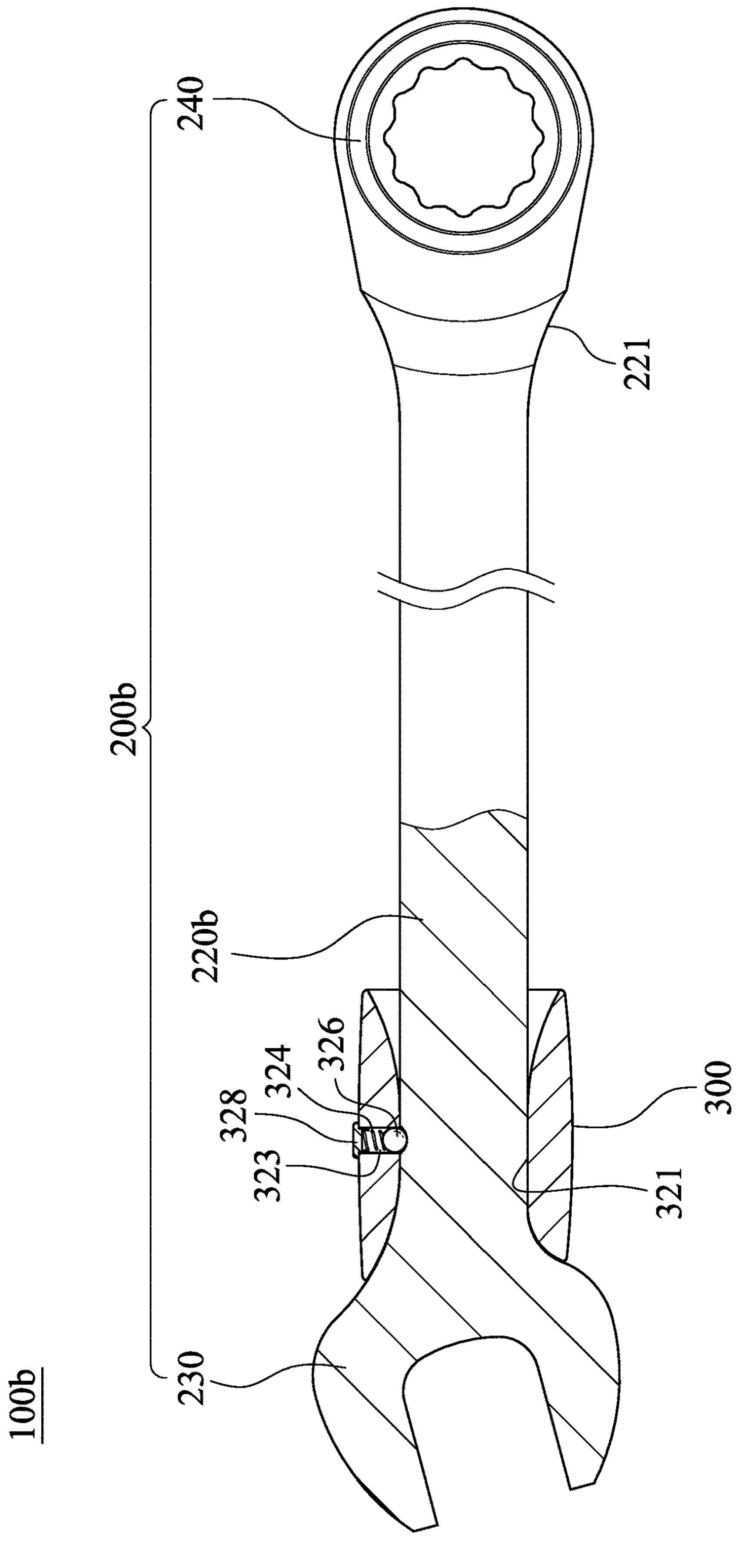
FIG. 5 is a perspective view of the wrench with a movable mallet platform according to the third embodiment of the present invention.

Please refer to FIG. 2 and FIG. 5. FIG. 5 shows a perspective view of the wrench 100*b* with a movable mallet platform according to the third embodiment of the present invention. The wrench 100*b* with a movable mallet platform, comprises a wrench main body 200*b* and a mallet platform 300. The wrench main body 200*b* comprises a shaft 220*b*. The shaft 220*b* comprises at least one abutment surface 221, 222. The mallet platform 300 comprises two striking portions 320 and two holding portions 340. One of the striking portions 320 includes an engagement surface 321 extending toward the shaft 220. In this embodiment, the abutment surface 221, 222, the two striking portions 320 and the two holding portions 340 have the same structure as that of the abutment surface 221, 222, the two striking portions 320 and the two holding portions 340 of the embodiment shown in FIG. 2 respectively; therefore, details thereof are omitted hereafter. It shall be noted that the shaft 220*b* further comprises a through hole 323, an elastic member 324, a roller 326 and a cover 328. The elastic member 324 is arranged at the through hole 323 and is perpendicular to the shaft 220. The roller 326 is connected to the elastic member 324 and is provided to abut against the abutment surface 222 of one of the striking portions 320. The cover 328 is arranged at the aforementioned striking portion 320 and is provided to retain the elastic member 324 at the through hole 323. The elastic member 324 can be a spring or other elastic member. Accordingly, the wrench 100*b* with a movable mallet platform of the present invention uses the roller 326 to abut against the abutment surface 222 in order to secure the mallet platform 300 at the shaft 220.

Figure 6:
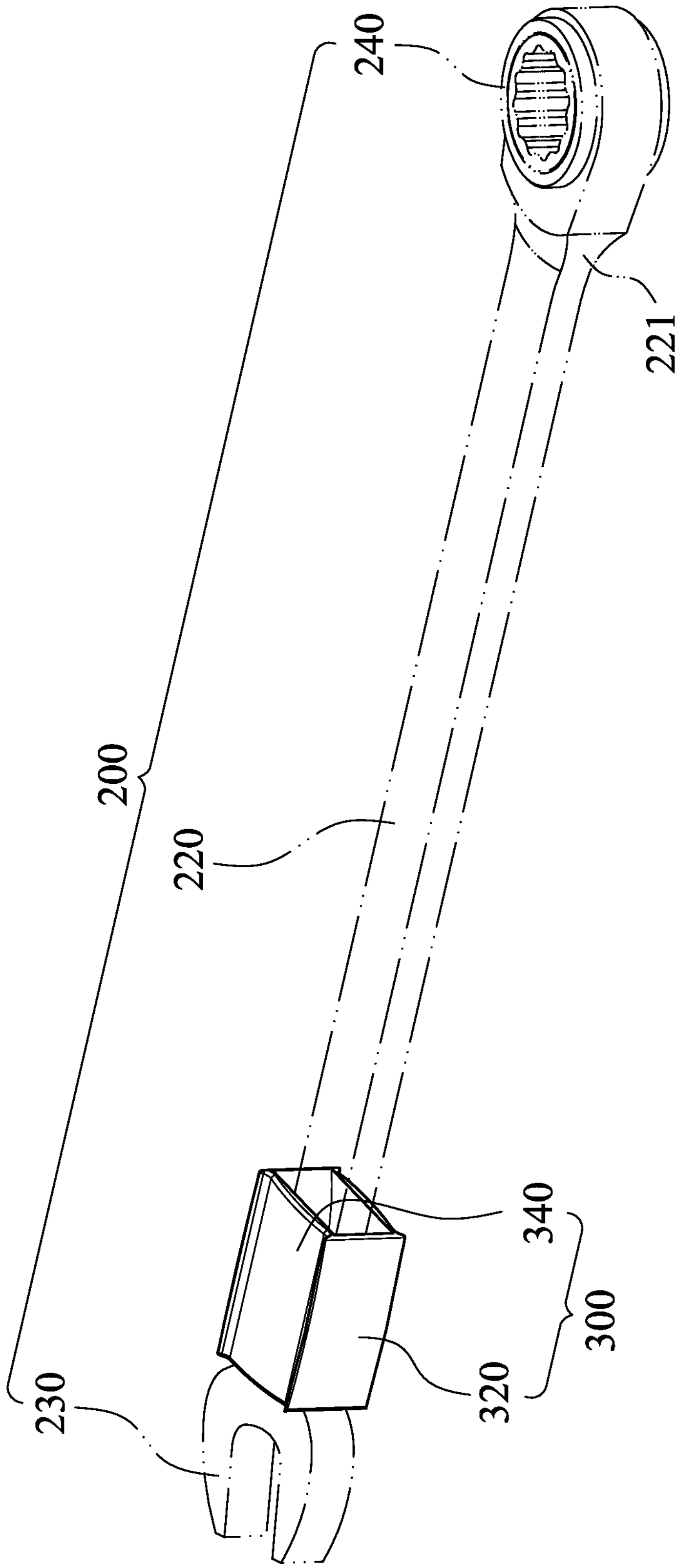
FIG. 6 is a perspective view of the mallet platform according to the fourth embodiment of the present invention.

Please refer to FIG. 2 and FIG. 6. FIG. 6 shows a perspective view of the mallet platform 300 according to the fourth embodiment of the present invention. The mallet platform 300 is arranged on a wrench main body 200, and the wrench main body 200 comprises a shaft 220. In addition, the shaft 220 comprises at least one abutment surface 221. The mallet platform 300 comprises at least one striking portion 320 and two holding portions 340. The at least one striking portion 320 includes an engagement surface 321 extending toward the shaft 220. The engagement surface 321 abuts against the at least one abutment surface 221. The two holding portions 340 are disposed opposite to each other and each one of the holding portions 340 is connected to the at least one striking portion 320. In addition, the mallet platform 300 is slidably sleeved on the wrench main body 200. In this embodiment, the mallet platform 300 has the same structure as that of the mallet platform 300 of the embodiment shown in FIG. 2; therefore, details thereof are omitted hereafter. It shall be noted that the mallet platform 300 can be removed from the shaft 220 of the wrench main body 200 such that it can be sleeved onto a wrench of a different specification. Accordingly, the mallet platform 300 of the present invention can be installed on a conventional wrench of different specification, such that the conventional wrench can be provided with a striking plane for striking by a striking tool, in order to fasten or release a fastening member. In another embodiment of the present invention, one of the at least one striking portion and the two holding portions of the mallet platform can be slidably removed from the mallet platform; however, the present invention is not limited to such configuration only.

In view of the above embodiments, it can be understood that the present invention includes the following merits. First, the wrench with a movable mallet platform of the present invention is able to provide a striking plane in order to increase the striking surface area during the use of a striking tool of the user while reducing the probability of accidental hand injury of the user due to impact of the striking tool on the shaft. Secondly, the wrench with a movable mallet platform of the present invention having the surfaces of the two holding portions coated with an anti-skid layer, the gripping force of the user can be increased in order to perform fastening or releasing action on the fastening member stably. Thirdly, the wrench with a movable mallet platform of the present invention is able to use the roller for abutting against the engagement surface in order to secure the mallet platform on the shaft. Fourthly, the mallet platform of the present invention can be installed on a conventional wrench of different specification, such that the conventional wrench can be provided with a striking plane for the striking by a striking tool, in order to fasten or release a fastening member.

The embodiments of the present invention are provided to illustrate the technical features and effect of the present invention only such that they shall not be used to limit the scope of the present invention. In addition, any person with ordinary skill in the art may make any changes and modifications to the present invention without deviating from the principle and scope of the present invention. Accordingly, the scope of protection of the present invention shall be based on the scope of the claims disclosed in the following.

What is claimed is:

1. A wrench with a movable mallet platform, comprising:
a wrench main body, comprising;
a shaft having at least one abutment surface; and
a mallet platform slidably sleeved on the wrench main body, and the mallet platform comprising:
at least one striking portion having an engagement surface extending toward the shaft, the engagement surface abutting against the at least one abutment surface; and
two holding portions disposed opposite to each other, and each one of the holding portions connected to the at least one striking portion,
wherein the mallet platform is continuously slidable over the wrench main body.

2. The wrench with a movable mallet platform according to claim 1, wherein the mallet platform further comprises:
an anti-skid layer covering the holding portions, and the anti-skid layer made of a rubber material.

3. The wrench with a movable mallet platform according to claim 1, wherein the mallet platform further comprises:
a holding structure arranged at each one of the holding portions, the holding structure configured to match a finger portion of a user and provided for the finger portion of the user to hold thereon.

4. The wrench with a movable mallet platform according to claim 1, wherein the mallet platform further comprises:

a through hole penetrating through the at least one striking portion;

an elastic member arranged at the through hole and perpendicular to the shaft;

a roller connected to the elastic member and provided to abut against the at least one abutment surface; and a cover arranged at the at least one striking portion and provided to retain the elastic member at the through hole.

5. The wrench with a movable mallet platform according to claim 1, wherein the wrench main body further comprises:

at least one driving end connected to the shaft and driving a hand tool along a driving direction of the wrench main body;

wherein the two holding portions are arranged parallel with the driving direction, and the at least one striking portion is perpendicular to the driving direction.

6. The wrench with a movable mallet platform according to claim 1, wherein a quantity of the at least one driving end is two, and the mallet platform is retained between the two driving end.

7. A mallet platform, arranged on a wrench main body, the wrench main body comprising a shaft, the shaft comprising at least one abutment surface, the mallet platform comprising:

at least one striking portion having an engagement surface extending toward the shaft, the engagement surface abutting against the at least one abutment surface; and two holding portions disposed opposite to each other, and each one of the holding portions connected to the at least one striking portion;

wherein the mallet platform is slidably sleeved on the wrench main body.

8. The mallet platform according to claim 7, further comprising:

an anti-skid layer covering the holding portions, and the anti-skid layer made of a rubber material.

9. The mallet platform according to claim 7, further comprising:

a holding structure arranged at each one of the holding portions, the holding structure configured to match a finger portion of a user and provided for the finger portion of the user to hold thereon.

10. The mallet platform according to claim 7, wherein the two holding portions are arranged parallel with a driving direction of the wrench main body, and the at least one striking portion is perpendicular to the driving direction.

* * * * *